3,169,819
DATA RECORDING SYSTEM

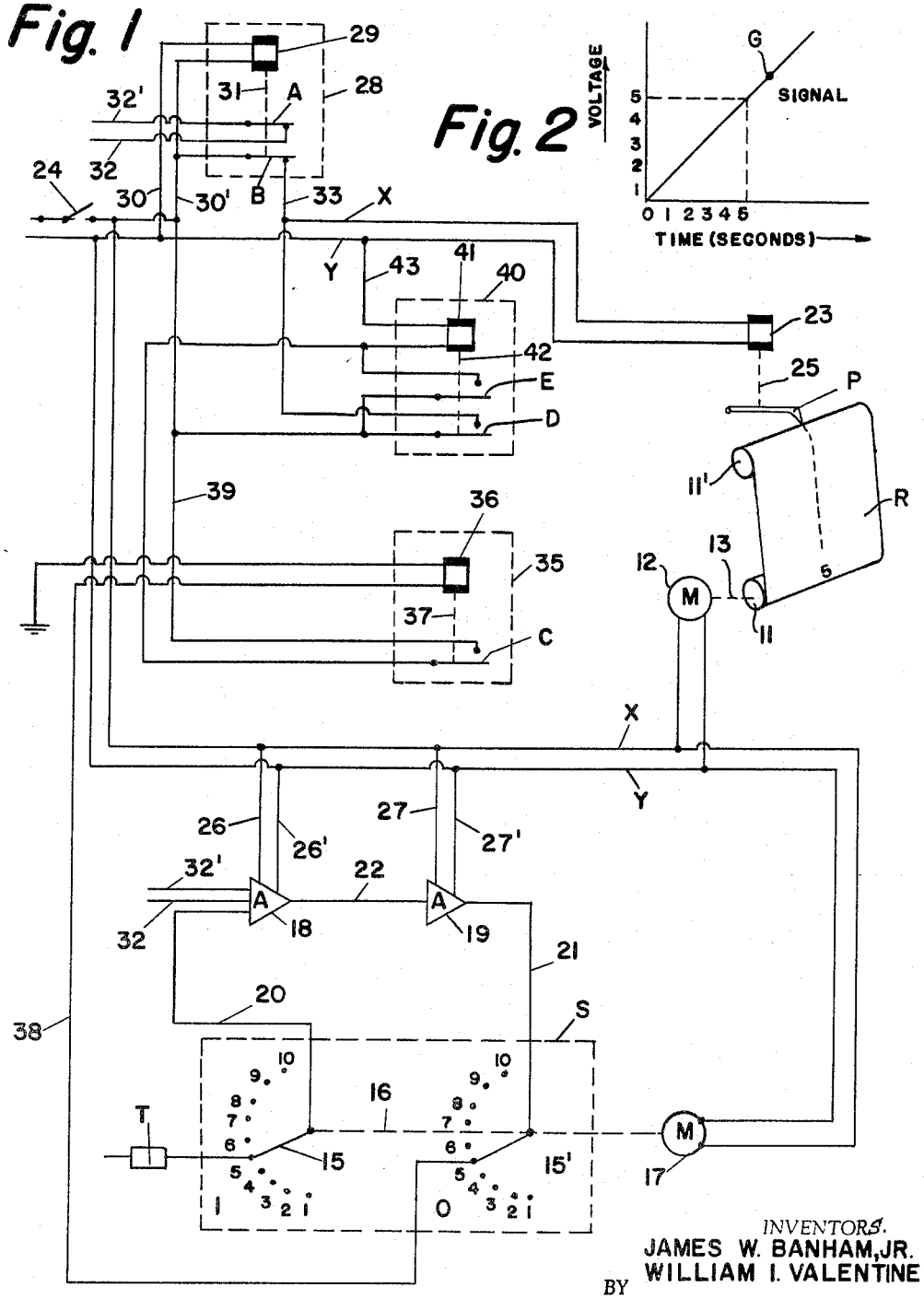

William I. Valentine, Glenolden, and James W. Banham, Jr., Drexel Hill, Pa., assignors to the United States of America as represented by the Secretary of the Navy
Filed Nov. 29, 1963, Ser. No. 327,153
2 Claims. (Cl. 346—33)
(Granted under Title 35, U.S. Code (1952), sec. 266)

The invention described herein may be manufactured and used by or for the Government of the United States of America for governmental purposes without the payment of any royalties thereon or therefor.

This invention relates to recording devices and in particular is concerned with an apparatus or system for recording a large number of steady state variables over a relatively short time interval.

The recording system contemplates scanning apparatus which is operated at a selected, or predetermined rate, to check voltages which are transmitted by transducers from the operation of an apparatus or process. A recording chart is operated synchronously with the scanning apparatus and a plurality of scribers or markers are provided to effect a recording of the value of each of the transmitted voltages. Electrical equipment, including a pair of cooperating amplifiers, is provided in the system and functions to limit each scribing operation to a time period which is proportional to the transmitted input voltage from each transducer. A refinement of the invention resides in the provision of additional circuitry to insure that a scriber effected only a single record during a cycle of operation.

The principal object of the invention is to provide an event recorder system which is arranged to record measured variables for a time period which is proportional to the input voltage of each variable.

Another object of the invention is to provide a recording system whereby intermittent recordings of measured variables from a steady state system may be effected.

Another object is to provide a recording system whereby a large number of variables may be recorded on a small recording unit over short time sampling period.

And another object of the invention is to provide a multi-channel event recorder system which is relatively simple in construction and inexpensive to produce and to operate.

Other objects and advantages of the invention will be apparent from an understanding of the following description considered in conjunction with the accompanying drawings in which:

FIGURE 1 is a schematic diagram of one embodiment of the recording system or apparatus utilizing an integrating amplifier for producing a ramp voltage.

FIGURE 2 is a graph illustrating the function of the integrating amplifier of FIGURE 1.

Referring to FIGURE 1, a recording chart is indicated at R and at P is indicated a scriber which is representative of a plurality of scribers. The circuitry will be described for the operation of only one scriber but it is to be understood that the system will include a scriber for recording each event and that separate circuitry will be provided for operating each scriber. In the lower portion of FIGURE 1, T indicates a transducer which transmits a voltage from an event such as the temperature or pressure, etc. of a process or apparatus and it will be assumed, for the purpose of this description, that voltages are being transmitted from ten such transducers during a recording cycle. A scanner is shown enclosed in a broken line rectangle indicated at S which has ten input contacts indicated at I and ten output contacts indicated at O.

The chart R is arranged for continuous movement relative to the scribers and for this purpose it is suitably mounted on rollers 11–11' and driven by motor 12 through suitable linkage 13 with the roller 11. The scanner S has two switches indicated at 15 and 15' which are mounted on a shaft 16 and rotatably driven by means of a motor 17 to effect a scanning of the I contacts by switch arm 15 and the contacts O by the switch arm 15'.

Two amplifiers indicated at 18 and 19 are arranged in series between the switches 15 and 15' and provide an arrangement for regulating the operation of the scribers P in accordance with the D. C. voltage from each transducer T. The switch arm 15 is connected to the amplifier 18 by conductor 20 and the switch arm 15' is connected to amplifier 19 by conductor 21 and the amplifiers are interconnected by conductor 22. The amplifier 18 operates to transmit signal voltage to amplifier 19 which in turn is operative to amplify the signal voltage which is then transmitted through output contacts O for operating other equipment in the system.

The amplifier 18 provides a means to generate a ramp voltage, that is to generate a voltage which is proportional to time and is operative to transmit a signal to the amplifier 19 when the ramp voltage exceeds the input voltage from a transducer T. When the ramp voltage which is generated by amplifier 18 exceeds the voltage that is transmitted by a transducer T a signal of low voltage is transmitted to amplifier 19 and is amplified to produce a pulse output in phase with the output of an O contact of the scanner S to control movement of the scriber P.

Motors 12 and 17 and also an electromagnet 23 are connected to the X and Y lines of the power circuit and are energized when switch 24 is moved from its shown open position to its closed position. The electromagnet 23 is connected by linkage 25 with scriber P and when the recorder R and scanner S begin to operate, the scriber P is raised to an inoperative position with respect to the recorder R. The amplifiers 18 and 19 are in circuit with the X and Y power lines by conductors 26–26' and 27–27' respectively as shown.

A time delay relay indicated at 28 has its electromagnet 29 in circuit with power lines X and Y by conductors 30–30' and is connected by linkage 31 with two normally closed holding switches A and B. The switch A is in circuit with amplifier 18 by conductors 32–32' and in its normally closed position prevents the amplifier 18 from generating a voltage and this amplifier is consequently maintained at zero voltage until switch A is in open position. Switch B is connected to power line X by conductor 33 and maintains the scriber P inoperative until this switch is in open position after which the scriber P will become operative. The scriber P will be operative to record on recorder R as long as switch B of relay 28 is open but this switch is arranged to be closed to prevent any scribing operation when a signal voltage is transmitted by amplifier 18 to amplifier 19. For this purpose another relay indicated at 35 has its electromagnet 36 connected by linkage 37 with a normally open switch C which is in ground circuit with the output contacts O of the scanner S by conductor 38.

One side of switch C is in circuit with switch B of relay 28 and switch D of a holding relay 40 by conductor 30' and the other side of switch C is in circuit by conductor 39 with a switch E of the holding relay 40. The switches D and E of relay 40 are normally held open by electromagnet 41, in circuit by connections 43 and 30' with the power lines X–Y.

The graph of FIGURE 2 shows a ramp voltage produced by the amplifier 18 of FIGURE 1 which is generated on the basis of 1 volt per second. On the graph point G represents a signal being transmitted as described in FIGURE 1 from the amplifier 18 by line 22 to the second amplifier 19 when the generated voltage is greater by an infinitesimal amount than the voltage transmitted by a transducer T.

In operation, when the starting switch 24 is closed as above described, the motors 12 and 17 will be in operation, power will be supplied to the amplifiers 18 and 19 and the scribers P will be inoperative or raised from the recorder R but no ramp voltage will be generated by amplifier 18. After a time for which time delay relay 28 is set, the switch A will be open and amplifier 18 will generate the desired ramp voltage. As voltages from the transducers T are transmitted by scanner switch arm 15, contacts I, conductor 20, the amplifier 18 will transmit a signal voltage at the instant the ramp voltage is greater than a voltage transmitted to amplifier 18 by the switch arm 15.

Assume as illustrated in FIGURE 2, that the amplifier 18 integrates at a rate of 1 volt per second and that the switch arm 15 is in contact with input contact 5 as shown in FIGURE 1 and also that transducer T has transmitted 5 volts to input contact 5, then when the generated voltage is an infinitesimal amount greater than 5 volts, a signal will be transmitted by conductor 22 to amplifier 19 by which the signal is amplified suitably for operating relays 35 and 40 to stop recording by scriber P. It will be understood that scriber P had begun the recording when the input voltage from transducer 5 was transmitted by the switch arm 15 and that the signal transmitted by amplifier 18 was operative to stop the recording operation, hence the broken line shown on the recorder R would indicate this voltage from transducer T. This voltage may be measured by operating the recorder R at a known rate, for example, at 1 inch per second and operating the scanner S to sample the inputs at 60 times per second.

Structural details of the scanner S are not shown since such two gang switching devices are commercially available. It is essential to utilize such a device which is designed to transmit voltages from and to the switches 15–15', respectively, during their rotation and that the switches will be in coacting physical contact with corresponding input and output elements of the contact sets.

Obviously many modifications and variations of the present invention are possible in the light of the above teachings. It is therefore to be understood that within the scope of the appended claims the invention may be practiced otherwise than as specifically described.

We claim:

1. A system for recording voltages which are transmitted during a cycle of operation of functional elements, said system comprising, (a) a first switch having a set of contacts for receiving the transmitted voltages and a first scanning contactor, (b) a second switch having a set of contacts corresponding to the first set of contacts and a second scanning contactor, (c) a shaft supporting the scanning contactors for simultaneous movement to engage corresponding contacts of each set, (d) a recording chart mounted for continuous movement, (e) a control circuit including a first motor for moving said contactors and a second motor for moving said chart, (f) solenoid means in the control circuit and mounting scriber means, (g) a voltage generator and a voltage amplifier in series between said first and second scanning contactors, (h) said voltage generator being operative to transmit a signal to the amplifier when the generated voltage is greater than a voltage transmitted from a functional element, (i) first relay means in the control circuit having first switch means connected to the voltage generator and second switch means connected to the solenoid means, (j) said first switch means being effective to energize the voltage generator and said second switch means being effective to cause the scriber means to effect a linear record on the chart when the first and second motors are energized, (k) second relay means in circuit with contacts of the second switch and having a normally open switch connected to the second switch means of said first relay means and (l) said second relay means being operative to close its normally open switch to stop the operation of the scriber means when the voltage generator transmits a signal to the amplifier and provides a linear record which is proportional to a transmitted voltage.

2. A system as set forth in claim 1, further characterized by the first relay means including a time delay switch means which is operative to prevent energization of the generator means and the solenoid means for a predetermined period after the first and second motors have been energized.

References Cited by the Examiner
UNITED STATES PATENTS
3,060,430  10/62  Paschkis _____ 346—32

LEO SMILOW, *Primary Examiner.*